United States Patent [19]

McCambridge

[11] Patent Number: 5,012,442

[45] Date of Patent: Apr. 30, 1991

[54] BUS RECEIVER POWER-UP SYNCHRONIZATION AND ERROR DETECTION CIRCUIT

[75] Inventor: John M. McCambridge, Northville, Mich.

[73] Assignee: Chrysler Corporation, Highland Park, Mich.

[21] Appl. No.: 286,196

[22] Filed: Dec. 19, 1988

[51] Int. Cl.⁵ .................................... G06F 15/00
[52] U.S. Cl. ................... 364/900; 364/950.3; 364/945.9; 364/939.7; 371/47.1
[58] Field of Search ... 364/200 MS File, 900 MS File; 370/101; 371/47.1, 57.1, 65

[56] References Cited

U.S. PATENT DOCUMENTS

| | | | |
|---|---|---|---|
| 3,867,579 | 2/1975 | Cotton et al. | 364/900 |
| 4,145,755 | 3/1979 | Suzuki et al. | 364/900 |
| 4,225,960 | 9/1980 | Masters | 371/47.1 |
| 4,275,457 | 6/1981 | Leighou et al. | 364/900 |
| 4,354,229 | 10/1982 | Davis et al. | 364/200 |
| 4,393,301 | 7/1983 | Svendsen | 364/900 |
| 4,471,481 | 9/1984 | Shaw et al. | 370/101 |
| 4,520,480 | 5/1985 | Kawai | 370/100.1 |
| 4,638,478 | 1/1987 | Hatabe | 370/101 |
| 4,660,195 | 4/1987 | Hatabe | 370/101 |
| 4,686,690 | 8/1987 | Sato | 371/47.1 |
| 4,807,231 | 2/1989 | Sato | 371/47.1 |
| 4,872,186 | 10/1989 | Gerhart et al. | 370/101 |

Primary Examiner—Michael R. Fleming
Assistant Examiner—Debra A. Chun
Attorney, Agent, or Firm—Wendell K. Fredericks

[57] ABSTRACT

A bus receiver power-up synchronization circuit synchronizes the receipt of parallel data messages transferred asynchronously as three byte words preceded and succeeded by idle bytes so as to receive complete and not partial messages. Also, the receiver scrutinizes the messages for faults and for too many or too few bytes.

4 Claims, 3 Drawing Sheets

Patent No. 5,012,442
1 of 3
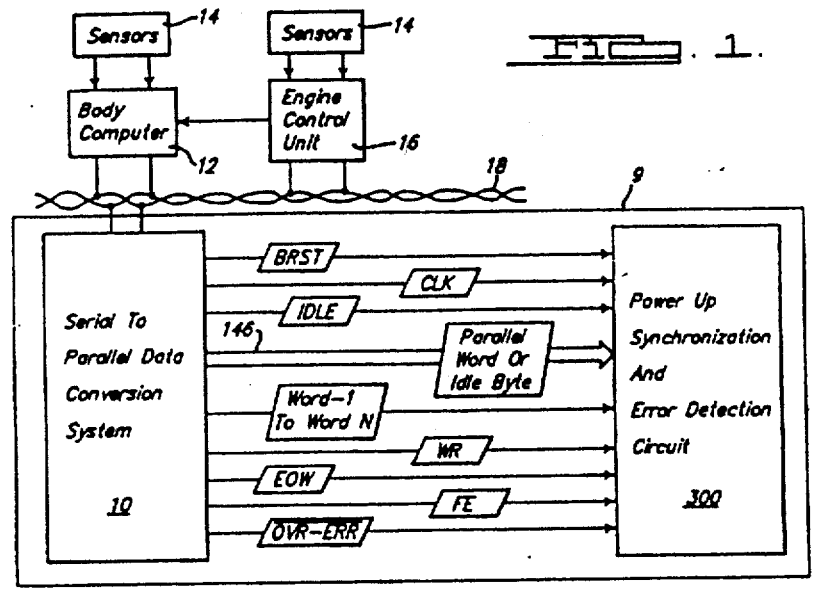
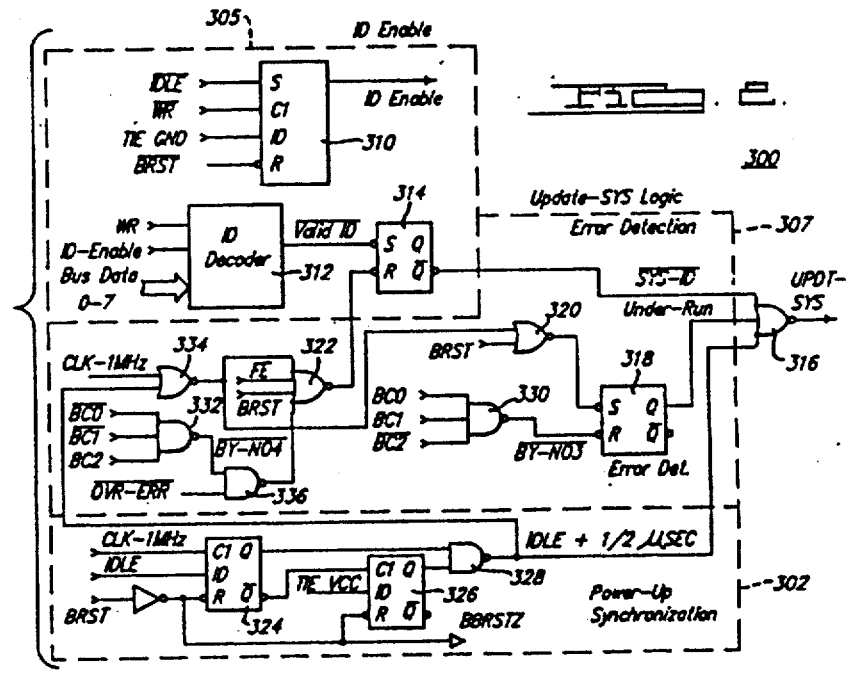

5,012,442

BUS RECEIVER POWER-UP SYNCHRONIZATION AND ERROR DETECTION CIRCUIT

BACKGROUND OF THE INVENTION

1. Field of the Invention:

The present invention relates generally to data synchronization and data error detection circuits and in particular to circuits in an asynchronous data reception device for synchronizing the transferred converted parallel word transmissions; i.e., serial to parallel data to the timing sequence of the data reception device during powerup and to circuits for detecting whether the transmitted parallel words sequence form a message usable by the reception device.

2. Prior Art

U.S. Pat. No. 4,885,583 dated Dec. 5, 1989 of the present inventor provides a circuit in an asynchronous device which converts serial data to parallel data and also flags out-of-range bits and framing errors. The present invention, as taught herein, may be used in cooperation with the structure claimed in this patent.

A problem exists when trying to power-up a bus receiver and have it extract data from messages broadcast asynchronously over a link intended for transceivers connected to the link. The bus receiver does not have means for informing the sender that the received messages contain overrange bits or that framing errors exist.

The bus receiver is essentially on its own in sorting out which messages are uncorrupted.

Also, in this system, each data message transfers as a three byte message preceded and succeeded by an idle byte. The bus receiver must get in synchronization with the transfer of each message so as to receive complete and not partial messages. The bus receiver must not only scrutinize the messages for errors but it must know when a data message contains too few or too many bytes.

To obtain the above-mentioned desiderata, a search for various means to synchronize receipt of asynchronously broadcast messages to the timing the receiver requires and at the same time scrutinize the data which was initiated. This search resulted in the power-up synchronization and error detection circuit of the present invention.

BRIEF SUMMARY OF THE INVENTION

The present invention concerns a novel receiver power-up synchronization and error detection circuit for synchronizing the parallel transmission of a series of three word (byte) messages, an idle period occurring between each message upon power-up of the receiver and the detection of errors in the quantity and quality of each byte. In this system, a serial to parallel data conversion system supplies the parallel transmitted words, timing and control signal, byte counts and error signals detected during the serial to parallel conversion.

The inventive system, after verifying that the sender wants to talk to a particular receiver, scrutinizes the data from the parallel data conversion system by avoiding the use of the initial parallel byte until some assurance that a complete packet of parallel bytes forms a message and that no errors previously detected by the serial to parallel conversion system will hamper the transferred message.

BRIEF DESCRIPTION OF THE DRAWING

FIG. 1 illustrates a data reception device containing a serial to parallel data conversion system connected to a data link and the power-up synchronization and error detection circuit of this invention;

FIG. 2 illustrates the combinational and sequential logic circuits of the power-up synchronization and error detection circuit of this invention;

DETAILED DESCRIPTION OF A PREFERRED EMBODIMENT

Figure 3:
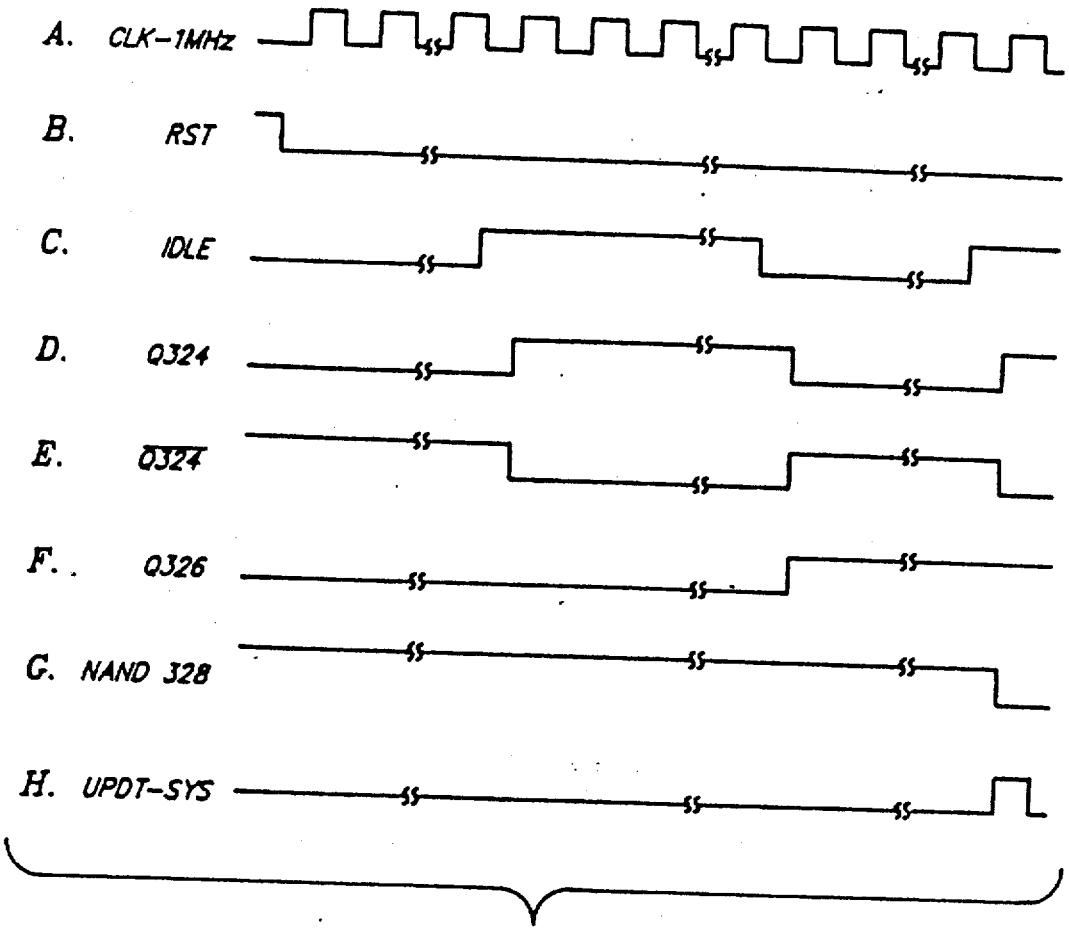
FIGS. 3A-3H illustrate the waveform diagrams of the various reactions and times of the signals needed to achieve power-up synchronization and for enabling the transfer of parallel word messages.

With reference to FIG. 1, there a block diagram depicts a bus data communication system used in a vehicle equipped with electronic features that employs the power-up synchronization and error detection circuit 300 of this invention.

Messages from the body computer 12 reaches circuit 300 after the serial to parallel data conversion system 10 receives and converts serially transmitted messages into parallel words. Illustratively, both the engine control unit 16 and the body computer 12 convert analog sensor data into digital signals. Certain signals used by receiver 9 route from the engine control unit 16 to the body computer 12 for transmission over link 18 to receiver 9.

System 10 converts the serial data into parallel data and provides control and error messages that allow receiver 9 to perform functions completely independent of the function performed by equipment associated directly with the link.

System 10 sends system reset information, clock signals, byte or word counts, framing error signals, overrange signals of bits in the transmission, and control signals indicating when the data appears ready for writing it into storage devices and signals indicating periods of idle bytes between the data messages.

After transmission of a parallel word, a WR signal issues from a WRITE latch (not shown) of system 10. A word counter also in system 10 counts each WR signal and then provides to the end-user a count of each word from word-1 to word-N or 3 in this embodiment. A chosen time period after the occurrence of each WR signal, an end-of-word (EOW) signal issues which the end-user receives and which enables the next word reception. After counting 3 successive words and ten idle bits of a logic one level on link 18, system 10 causes an IDLE signal to go HIGH which resets the word counter and this sequence repeats for the next transmission of the parallel words.

Figure 4:
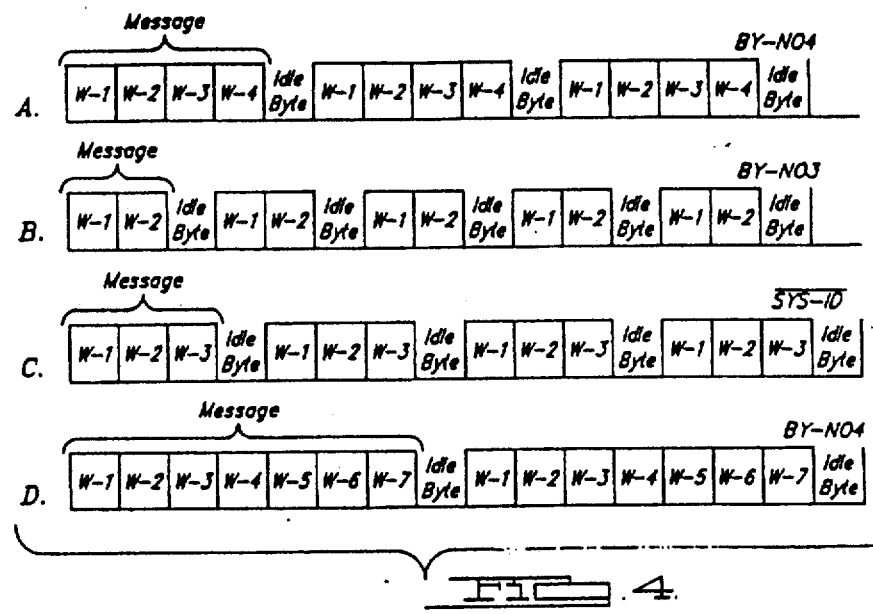
FIGS. 4A-4D depict various parallel word messages from a serial to parallel conversion system that route to the power-up synchronization and error detection circuit of this invention.

The serial to parallel data conversion system 10 receives serial messages of different lengths for different receivers and converts them to parallel word messages. FIG. 4 depicts parallel word messages from system 10 that route to the power-up synchronization and error detection circuit 300. Circuit 300 only wants to receive messages of the format depicted in FIG. 4C. Messages with less than three words, as in FIG. 4B, generate BY-NO3 error signals while signals with more than three words, as in FIGS. 4A and 4D, generate BY-NO4 error signals. The error signals inhibit any transfer of messages from system 10 to end-user equipment connected to circuit 300.

AT POWER UP, in order to synchronize the output of parallel words to the timing of the idle periods between messages, circuit 302 delays transfer of the initial three word (byte) message until after the receipt of two IDLE periods, the IDLE periods occurring between each message. This procedure occurs regardless of the content of the initial message.

This means that an IDLE+½ microsecond signal will not generate until two idle periods occur for any of the patterns of parallel data depicted in FIGS. 4A-4D.

POWER UP SYNCHRONIZATION

FIGS. 3A-3H depict waveforms associated with synchronizing the IDLE signal from circuit 300 with the parallel messages from the serial to Parallel Data Conversion System 10. Two rising edges of the idle signal of FIG. 3C must occur before the IDLE+½ microsecond signal (FIG. 3G) makes a transition from a high to a low level signal. When IDLE+½ user signal goes low, the UPDT-SYS signal (FIG. 3H) emanating from NOR gate 316 can go from a low to a high level signal permitting the transfer of the parallel word messages from system 10 provided low SYS-ID and under-run signals exist.

To maintain the IDLE+½ microsecond signal HIGH until the second rising edge of IDLE on power up a high BRST signal (FIG. 3B) from system 10 initially resets synchronously clocked flip-flops 324 and 326 respectively causing low signals from the Q-output signals and produces a high IDLE+½ microsecond signal at an output terminal which routes to an input terminal of NOR gate 316 which holds the UPDT-SYS signal low.

Assuming receiver 9 powers up in the middle of a message prior to the occurrence of the first rising edge of the IDLE signal (FIG. 3C) from system 10, during a low to high transition of a 1 MHz clock signal as depicted in FIG. 3A, the low IDLE signal clocks through flip-flop 324 to the input of NAND gate 328 maintaining the output signal IDLE+½ microseconds high and the UPDT-SYS signal from NOR gate 316 low.

After the low to high transition of the first IDLE pulse signal, another rising edge of the 1 MHz clock signal clocks the high IDLE signal to the input of NAND gate 328. The Q output of flip-flop 326 remains; hence, the UPDT-SYS signal from NOR gate 316 remains low. The high IDLE signals occur after each message transfer as depicted in FIGS. 4A-4D. Since the UPDT-SYS signal remains low, no message gets transferred prior to receipt of two rising edges of the IDLE signal.

Again referring to FIGS. 3A-3G, after the first IDLE pulse signal returns to low as depicted in FIG. 3C, the rising edges of the 1 MHz clock signal clocks, the low IDLE signal through flip-flop 324 to cause the not Q-output to go from low to high producing a clock signal for flip-flop 326 which clocks Vcc through to the Q-output and on to the input of NAND gate 328. This action maintains a high IDLE+½ microsecond signal which, in turn, keeps the UPDT-SYS signal low.

At the occurrence of a high second IDLE signal, the 1 MHz clock signal clocks the high IDLE signal thorugh flip-flop 324 to the input of NAND gate 328.

The high IDLE signal along with the high Q-output signal from flip-flop 326 entering gate 328, a low IDLE+½ microsecond signal occurs enabling NOR gate 316 to produce a high UPDT-SYS signal provided the other inputs to NOR gate 316 are low signals.

SYS-ID VERIFICATION

As circuit 302 synchronizes the IDLE pulses with the parallel messages from system 10, a system ID circuit 305 operates to establish that a wired address within receiver 9 and the addresses transferred over link 18 coincide.

Figure 5:
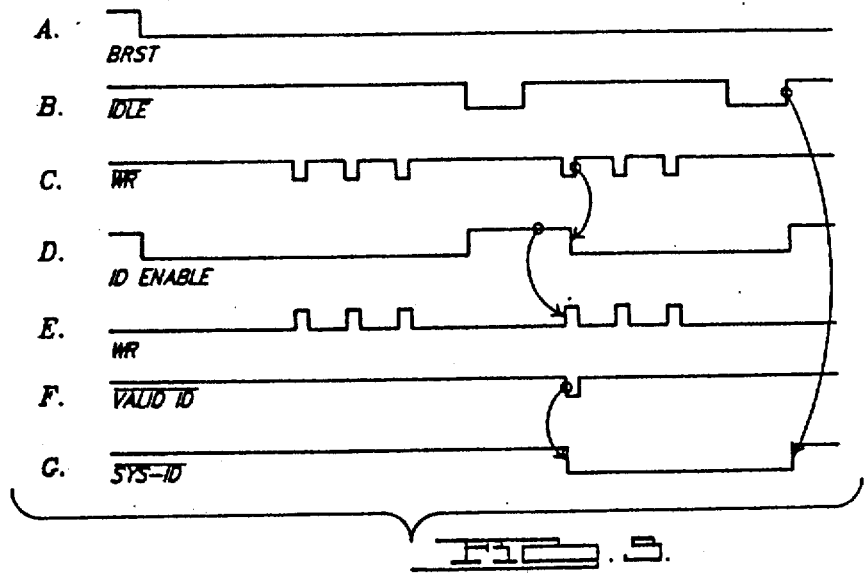
FIGS. 5A-5G illustrate waveforms of the signals applied to the power-up synchronization and error detection circuit for addressing the receiver containing the circuits of this invention.
Figure 3:
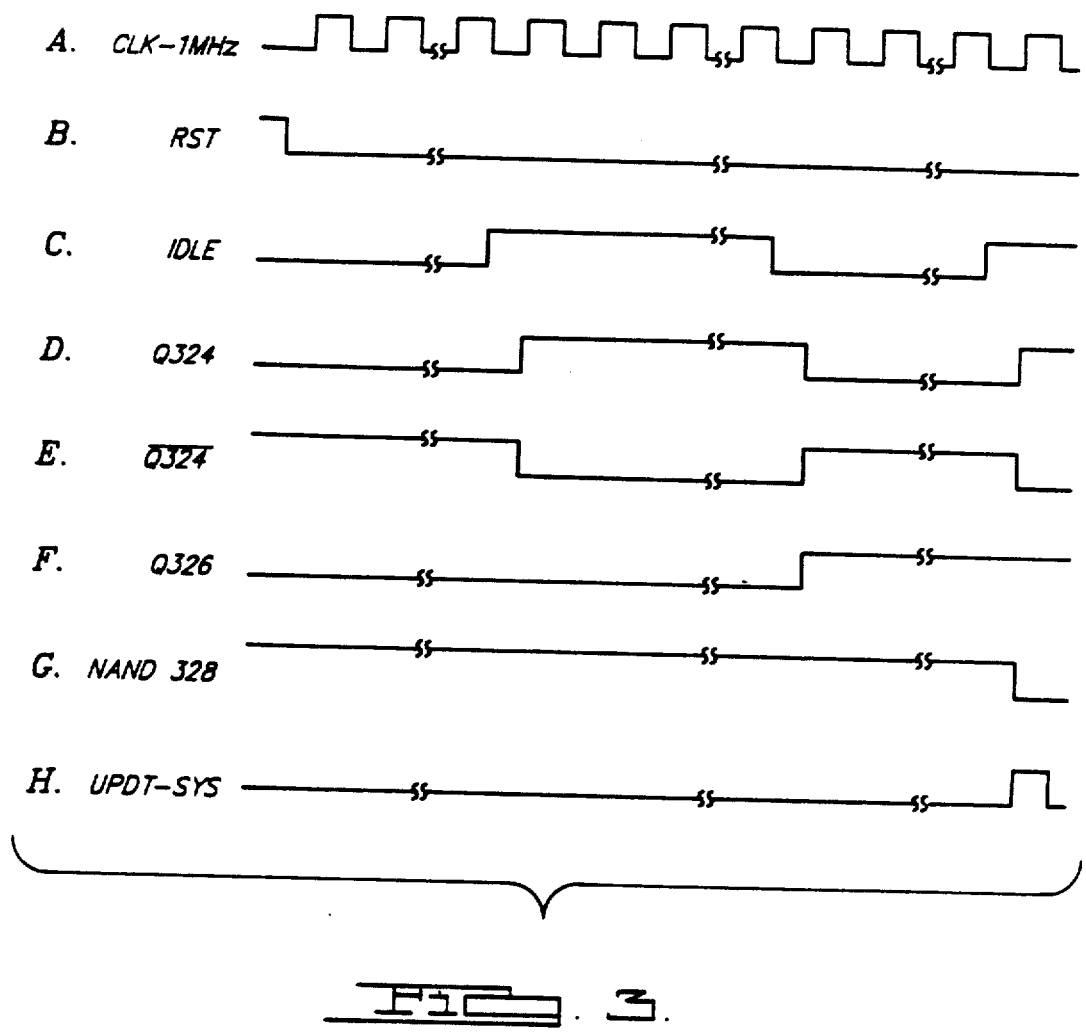
Figure 4:
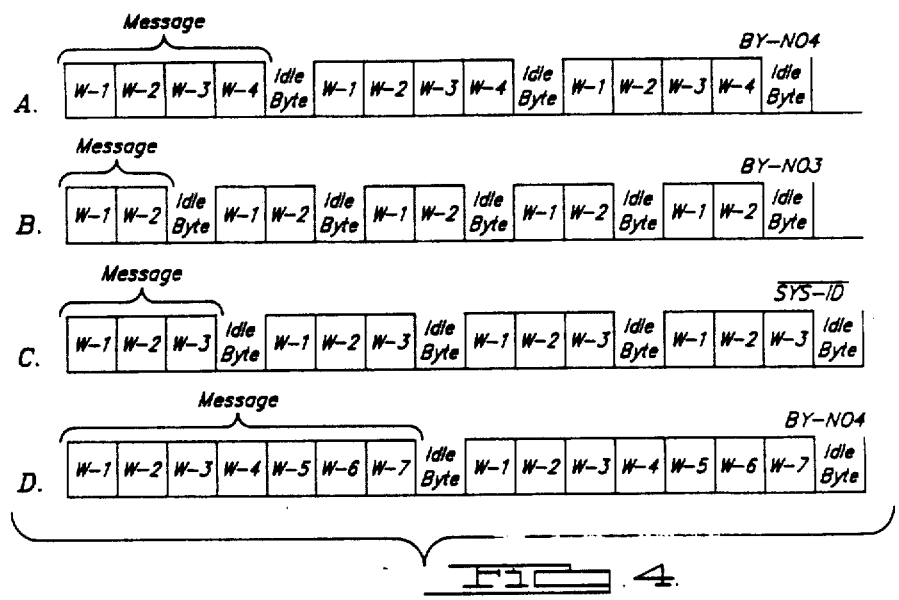
Figure 5:
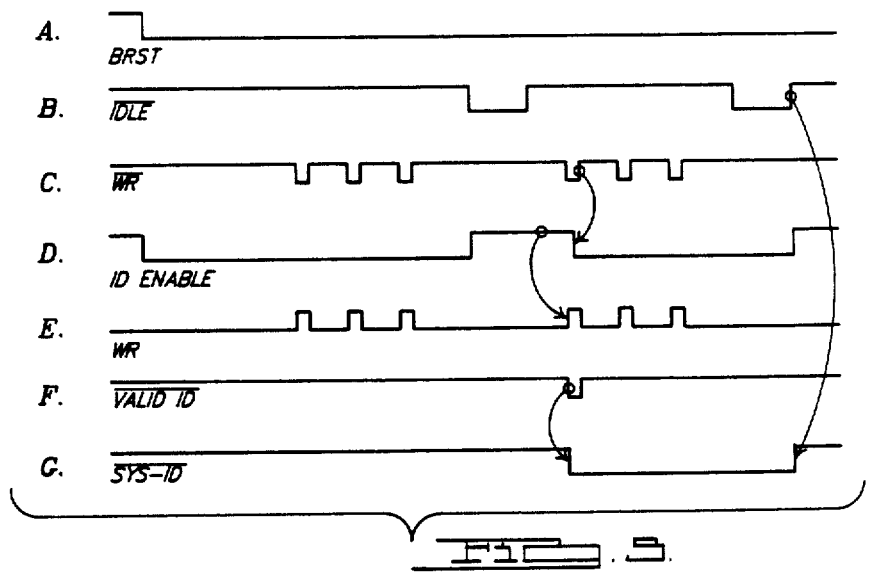

FIGS. 5A thorugh 5G depict waveforms associated with address or ID verification. Signals entering synchronous flip-flop 310 generate ID enable pulses as shown in FIG. 5D. At power on when the BRST signal going to the reset input of flip-flop 310 goes from high to low as in FIG. 5A, the ID enable signal goes low.

Then on the leading edge of the negative pulse of the not IDLE signal of FIG. 5B, ID ENABLE goes high as depicted in FIG. 5D since the low not IDLE signals applies to the set input of flip-flop 310 which overrides all other inputs causing the high ID ENABLE signal. As indicated in FIGS. 5C and 5D, ID ENABLE goes high after the first series of WR signals occur.

On the rising edge of the first WR pulse of the next series of WR pulses, while a high ID ENABLE exists, and ID decoder 312 samples the message on the parallel data bus 146 from system 10. If the address in the message coincides with a fixed hardwired address in decoder 312, then a low not VALID ID signal outputs indicating a match, if not a high not VALID ID signal output.

If a valid ID signal occurs, then the low not VALID ID signal sets an asynchronous R-S flip producing a low not SYS-ID signal which routes to NOR gate 316 to enable the UPDT-SYS signal as depicted in FIGS. 5D-5G.

The ID ENABLE signal goes low and the not VALID ID signal goes high on the trailing edge of the first WR signal. The not SYS-ID signal goes which when IDLE goes low or not IDLE goes high.

ERROR DETECTION CIRCUIT

Error detection occurs constantly during power up synchronization as well as during the transfer of parallel word messages. Circuit 307 of FIG. 2 performs the constant error detecting.

A high (H) UNDER-RUN signal or a HIGH (H) SYS-ID signal generates an error signal which inhibits the transfer of the parallel messages. Tables I and II summarize the various system conditions affecting circuit 307. In the tables H=high and L=low level signals.

TABLE 1

| UNDER RUN | |
|---|---|
| H | BRST: H |
| H | IDLE + ½ μs: H |
| HL | BC0: H and BC1: H and $\overline{BC2}$: L |

TABLE 2

| $\overline{\text{SYS-ID}}$ | |
|---|---|
| H | FE:H |
| H | $\overline{\text{BRST}}$:H |
| H | $\overline{\text{BC0}}$:H and $\overline{\text{BC1}}$:H and BC2:H |
| H | $\overline{\text{OVR-ERR}}$:L |
| H | $\overline{\text{IDLE} + \frac{1}{4} \mu s}$:L and CLK-1MHz:L |
| HL | $\overline{\text{VALID-ID}}$:L |

In summary, if the message contains a sufficient number of words, then an UNDER-RUN error doesn't occur and if the address word provides a correct match, then a SYSTEM-ID error doesn't occur.

After the low to high transition of the first IDLE signal, another leading edge transition of the 1 MHz clock signal clocks the high IDLE signal to the input of NAND gate 328, the Q output of the flip-flop 326 remaining low, thus continuing to hold the UPDT-SYS signal low. The high IDLE signal occurs after the transmission of 10 idle bits over link 18 to system 10.

However, after the first IDLE signal returns to low, the leading edge of the clock signal clocks the low IDLE signal through flip-flop 324 to the Q output causing the QZ output to go from low to high producing a clock signal to flip-flop 326 which clocks Vcc through to the Q output and on to the input of NAND gate 328.

Upon the occurrence of a high second IDLE signal, the 1 MHz clock signal clocks the high through flip-flop 324 to the input of NAND gate 328 enabling NAND gate to produce a low IDLE+¼ microseconds signal to the input of NOR gate 316.

If at the same time a low SYS-ID signal and a low UNDER-RUN (we are using a low UNDER-RUN signal at this point to illustrate the UPDT signal action, under-run actually is high until after the third received byte) signal occurs, then the UPDT signal will go high for ¼ microseconds. The low SYS-ID signal occurs if an ID-ENABLE flip-flop 310 provides a high ID-ENABLE signal to the ID DECODER 312 during a match between the wired system address and the address transferred over the data bus during a WR signal so as to produce a low not VALID-ID signal which sets flip-flop 314, thus producing a low SYS-ID signal.

The high under run signal occurs when BY-NO3 is high and the set input to the flip-flop 318 is low. A high BY-NO3 occurs if too few bytes are transferred to system 300. If too many bytes are transferred to system 300, then a low BY-NO4 occurs causing flip-flop 314 to reset, keeping the UPDT-SYS signal low.

However, the SYS-ID signal will not occur if an error signal is detected by system 10 or too many bytes are transferred since flip-flop 314 will reset if a high FE, a low BY-NO4, low OVR-ERR signal exist.

Within ¼ microseconds after the UPDT signal goes high, the 1 MHz clock signal goes low allowing the output of NOR gate 334 to go high thus driving the output of gate 322 low, which resets the flip-flop 314, which makes SYS-ID high which, in turn, returns the UPDT signal to low.

This sequence of events produces the low-high-low transition of the UPDT signal which inform the end-user device that the receiver is in synchronization with the timing of the message transfer rate being used to transfer signals over bus 18 and that no initial errors appear in the first data message received from the bus.

With reference now to FIG. 3, there is shown a timing diagram illustrative of the reactions of flip-flop 324 and 326 and RST which hold UPDT-SYS signal low until two idle signals transpire. Also, FIG. 3 depicts the generation of the UPDT-SYS pulse after the two initial idle signals after powerup and the absence of any error signals that would inhibit the pulse.

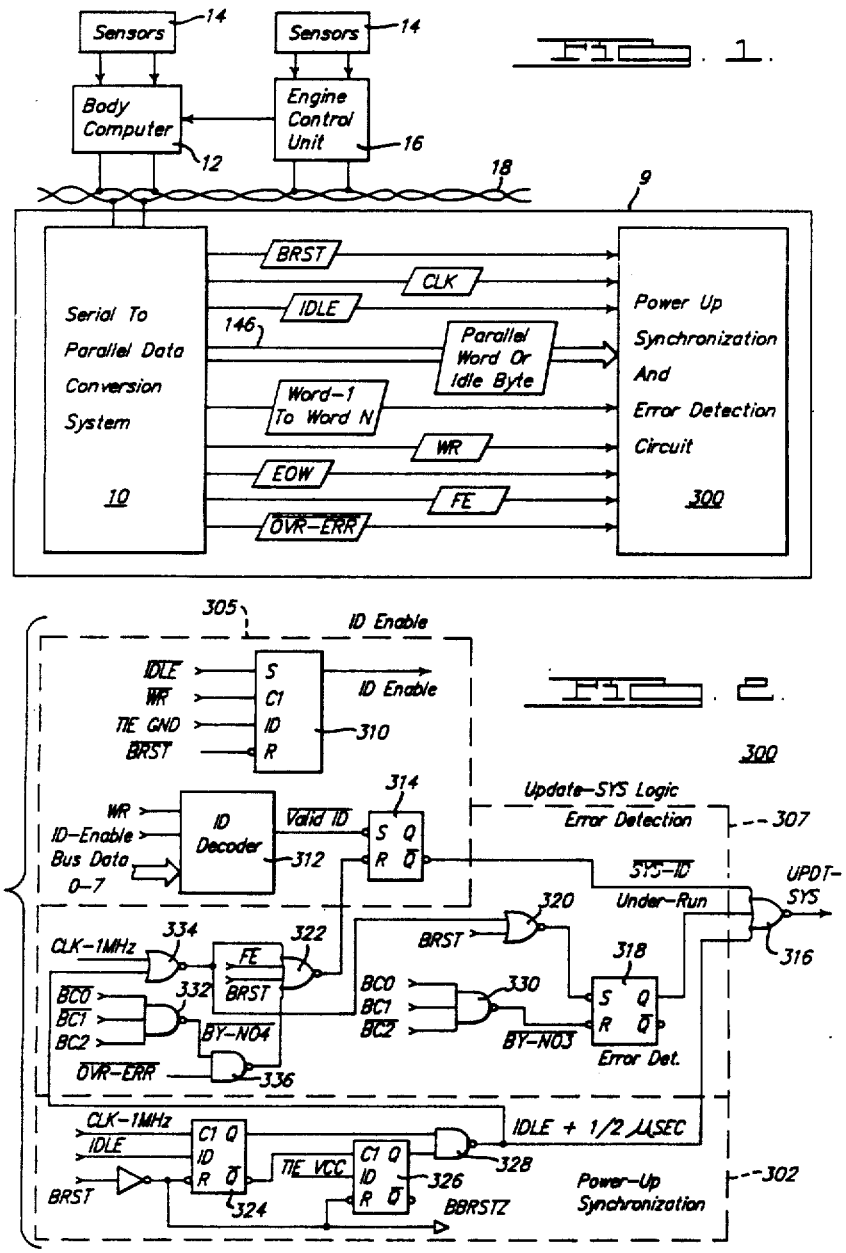

What is claimed is:

1. A power-up synchronization and error detection apparatus of an addressable bus receiver for synchronizing receipt of asynchronously transferred parallel word messages from a serial to parallel conversion system of said bus receiver and for further transferring of said parallel words to an end user device, said receiver having input terminals coupled to a data link which transfers serially digital messages from a bus transmitter, the but transmitter broadcasting separate serial messages of a distinctive number of words to said receiver and to a plurality of other addressable bus receivers, said receiver responding to serial messages containing a chosen number of words, said other receivers responding to messages containing a different number of words, each of said messages being preceded and succeeded by a fixed number of IDLE bits used for distinguishing each message placed on said data link, one of said words of each message containing address information for use by said receiver and said other receivers in receiving said messages from said bus transmitter, said serial to parallel conversion system of said receiver also providing: (1) a system clock signal for use in synchronizing synchronous sequential circuits of said apparatus, (2) an IDLE signal for indicating transmission of IDLE bits, (3) a system buffered reset (BRST) signal for resetting sequential logic circuits of said apparatus during power-up and restart of operations, (4) a write (WR) pulse signal following the formation of each parallel word, (5) a framing error (FE) pulse signal for indicating a missing stop bit in the serially transferred data from the link, (6) an over range error (OVR-ERR) signal which responds to each serial bit received, and (7) word-1 to word-N (BC-0 to BC-B) signals that designate the word content of each message, said apparatus comprising:

(a) power-up synchronization logic means having input terminals for receiving said BRST, said IDLE and said clock (CLK) signals regardless of the content of said parallel word message transferred from said serial to parallel data conversion system of said receiver during power up of said receiver and producing therefrom at an output terminal a disabling IDLE+¼ microsecond signal after receipt of a chosen number of rising edges of IDLE pulse signals which synchronizes receipt of said parallel word messages to said IDLE pulse signals said IDLE+¼ microsecond signal being an enabling signal used in said receiver to inhibit transfer of said parallel words to the end user device until after the occurrence of said chosen number of rising edges of said IDLE pulse signals;

(b) address logic circuit means adapted to receive at input terminals inverse signals of IDLE, WR and BRST along with parallel word messages from said data conversion system and producing therefrom at an output terminal a system identification (SYS-ID) signal representing a match between an address word contained in the parallel message and a corresponding hardwired address within said address logic circuit means, said SYS-ID signal also being used to enable transfer of said parallel words to the end user if a match occurs or to disable transfer if a match does not occur;

(c) error detection logic mean shaving input terminals adapted to receive signals of BCO-BCN, WR, FE, BRST, OVR ERR, CLK from said data conversion system and said IDLE+½ microsecond signal from said power-up and synchronization logic means and producing therefrom at an output terminal an error signal if any of the designated input signals combine in a chosen manner that would hinder transfer of said parallel word messages to the end user device; and (d) an update system logic means adapted to receive at input terminals said IDLE+½ microsecond signal, said SYS-ID signal and said error signal and producing at an output terminal an enabling update conjunctive signal representing an enabling signal which allows the further transfer of said parallel word messages to the end-user device if the sum of said IDLE+½ microsecond signal, said SYS-ID signal and said error signal causes an enabling signal at the output of said update system logic means.

2. Apparatus in accordance with claim 1 wherein said chosen number of rising edges of said IDLE pulse signals are two, and wherein said IDLE to ½ microsecond signal includes said IDLE signal pulse ½ microsecond delay caused by the operation of a synchronous sequential logic circuit which is synchronized with respect to said CLK signal and which delays the passage of said IDLE signal by approximately ½ microseconds.

3. Apparatus in accordance with claim 2 wherein said address logic circuit means includes sequential logic having a circuit responsive to an asynchronous signal such as said IDLE pulses for generating an ID ENABLE signal after the transmission of an initial parallel word message; wherein on a rising edge of a first WR pulse of the next series of WR pulses while said ID ENABLE signal exists, a decoding circuit samples the next transmitted parallel word message for coincidence between an address in said next message and a fixed hardwired address in said decoding circuit, and wherein said address logic circuit means also includes means for providing a signal for inhibiting the transfer of said messages if a mismatch occurs.

4. Apparatus in accordance with claim 3 wherein said error detection circuit provides bit error, frame error and parallel word size error detection continually from power-up of said receiver until said parallel word messages are transferred.

* * * * *

UNITED STATES PATENT AND TRADEMARK OFFICE
CERTIFICATE OF CORRECTION

PATENT NO. : 5,012,442

DATED : April 30, 1991

INVENTOR(S) : John M. McCambridge

It is certified that error appears in the above-identified patent and that said Letters Patent is hereby corrected as shown below:

The sheets of Drawing consisting of Figs. 1 thru 5 should be added as shown on the attached pages.

Signed and Sealed this

Sixth Day of October, 1992

*Attest:*

DOUGLAS B. COMER

*Attesting Officer*     *Acting Commissioner of Patents and Trademarks*